United States Patent [19]

Vesely et al.

[11] Patent Number: 4,934,854
[45] Date of Patent: Jun. 19, 1990

[54] CAULKING TOOL

[75] Inventors: Ivan Vesely, Holzkirchen; Xaver Kreitmair, Dachau, both of Fed. Rep. of Germany

[73] Assignee: MAN Nutzfahrzeuge Aktiengesellshaft, Munich, Fed. Rep. of Germany

[21] Appl. No.: 274,187

[22] Filed: Nov. 18, 1988

[30] Foreign Application Priority Data

Nov. 28, 1987 [DE] Fed. Rep. of Germany ....... 3740464

[51] Int. Cl.$^5$ .......................... E04F 19/02; B05C 17/00
[52] U.S. Cl. ..................................... 401/265; 401/261
[58] Field of Search ............... 401/139, 261, 265, 266; 222/328, 386, 566, 567, 575; D8/14.1; 425/87, 458; 15/236.01, 236.02, 256.5, 105, 105.5; 30/141

[56] References Cited

U.S. PATENT DOCUMENTS

| 704,577 | 7/1902 | Puff | 401/266 X |
| 1,038,180 | 9/1912 | Moreland | 401/266 X |
| 2,533,367 | 12/1950 | Gruszecki . | |
| 2,688,243 | 9/1954 | Bowen | 401/261 X |
| 2,876,782 | 3/1959 | Hudgens | 401/139 X |
| 2,903,739 | 9/1959 | Hann | 401/265 X |
| 3,536,411 | 10/1970 | Eisert | 401/266 X |
| 4,570,834 | 2/1986 | Ward | 401/266 X |

OTHER PUBLICATIONS

Hawley's Condensed Chemical Dictionary, Eleventh Ed., Van Nostrand Reinhold Co., 1987, pp. 5, 351.

Primary Examiner—Richard J. Apley
Assistant Examiner—David F. Crosby
Attorney, Agent, or Firm—Ladas & Parry

[57] ABSTRACT

A universal tool for caulking windows with different types of glazing sealant.

In order to achieve this aim the tool has as its main parts a handle and a caulking portion distally ending in a beak adjoining a channel on the side of the tool to be turned towards the window pane. In its part extending proximally from the beak the tool is formed with a hole to receive the glazing sealant. This hole extends from its proximal end in the part of the caulking portion adjacent to the handle to a position adjacent to the channel. The part of the tool including the beak, the channel and the distal end of the hole is made so as to have an elliptical outline when viewed in the proximal direction from the tip.

6 Claims, 1 Drawing Sheet

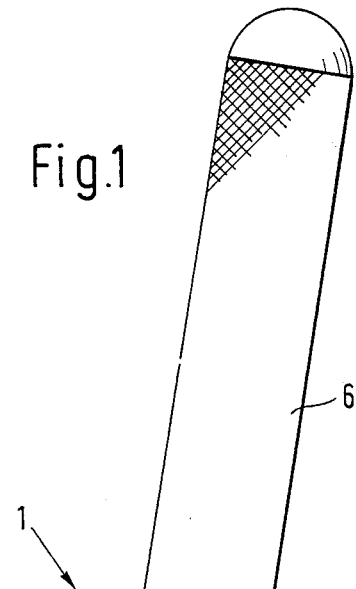
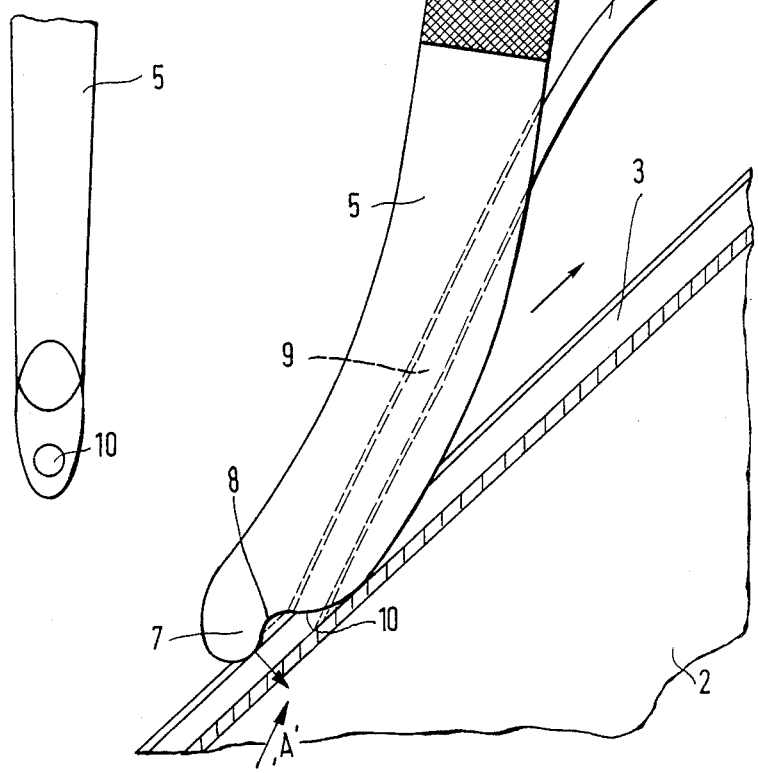

CAULKING TOOL

BACKGROUND OF THE INVENTION

The invention relates to a caulking tool for placing a window frame or glazing sealant in the channels of window frames on commercial vehicles comprising a handle and caulking member adjoining the handle.

Various forms of caulking tools are used for introducing different types of window frame sealant, but they are difficult to manipulate, do not have an ergonometric form and are so designed that they are only either capable of introducing the sealant with a drawing movement or with a thrusting one.

SUMMARY OF THE INVENTION

One object of the present invention is to provide a universal caulking tool for use with different sealant sections.

A further object of the invention is to provide a caulking tool which may be used both with a drawing motion and with a thrusting one.

In order to achieve these or other objects appearing from the present specification and claims the caulking tool of the invention is characterized in that the caulking portion is banana-shaped with a beak at the distal end and a channel adjacent to the beak. Along its longitudinal extension from the beak the tool has a guide hole for the window sealant section arranged so that the hole commences at the handle of the tool and opens distally adjacent to the channel and the part of the tool including the beak, the channel and the distal opening of the hole has a substantially elliptical cross section when viewed in the proximal direction. It is with such a design of the tool that it is possible to achieve improved ergonometrics leading to a better transmission and distribution of the drawing, thrusting and supporting forces. The glazer is equally able to use the tool, in accordance with his personal preferences and working position he has to adopt, as a means for drawing in the glazing sealant section or for pushing it into place. The elliptical form of the distal part of the tool serves to pry the sides of the glazing channel apart and makes various twisting motions possible. The hole in the tool with its distal end opening adjacent to the channel and the distal beak or nose make possible highly effective control and reliable insertion of the sealant section with the application of only a gentle force.

In accordance with one preferred feature of the invention the tool is adapted to receive cartridges with different sealant sections in the guide hole and to make it possible for such cartridges to be replaced. This feature enables the range of application of the tool to be substantially enlarged since it is then possible to use it for sealant sections with different geometries, for which purpose the cartridge may be quickly replaced by a different one.

In accordance with other features of the invention the tool may be made of resin, more specially an acctyl resin such as Delrin. This leads to a series of advantages such as desirable sliding properties when engaging the frame and sealant, little danger of injury and, more especially when the tool is made of Delrin, very little deformation owing to changes caused by moisture.

According to a further feature of the invention the caulking tool may have a screwdriver tip so that it may also be used to remove sealant sections.

Further advantages and features of the invention will be seen from the claims and the following description of an embodiment of the invention based on the drawing.

BRIEF DESCRIPTION OF THE FIGURES

FIG. 1 shows the caulking tool of the invention from the side while being used.

FIG. 2 is a view of the end of the tool as seen in the direction of arrow A.

DESCRIPTION OF PREFERRED EMBODIMENT OF THE INVENTION

In FIG. 1 there is seen the caulking tool 1 in the process of being used to introduce a window frame sealant section 4 in the glazing channel 3 of a window frame 2. The main sections of the caulking tool include a haandle 6 and a caulking section 5 preferably made integrally therewith. The free or distal end of the caulking section 5 is in the form of a beak 7 or nosepiece which may be used to pry open the glazing channel. The beak 7 adjoins a channel 8 which merges via a curved part with the inner side of the caulking section 5 having a constant cross section. Along the longitudinal extension of the caulking section t6 there is a guide hole 9 to receive the window frame sealant 4, which guide hole extends from a sealant inlet at its proximal end in the caulking sections adjacent to the handle 6 to its distal outlet opening 10 adjacent to the channel 8. The caulking tool is made of resin so that it may be molded or cast in its banana-like form and fits in the hand of the glazer, who may use it with a drawing or a thrusting, inserting action as may be required to meet a particular production application or in accordance with his own inclination. The tool can be made of a molded acetyl resin, such as DELRIN 150 SA/100 heat tempered at 160° C.±3°. If Delrin is used as the material of the tool there is the advantage of high strength and little tendency to absorb water so that the tool is very dimensionally stable.

If the handle 6 is grooved or knurled it is more readily gripped in the hand of the user. If it is made with a screwdriver tip it becomes a universal tool with an even wider range of applications and it may be used to remove sealant sections.

When the distal end of the caulking section 5 is viewed in the direction of arrow A in FIG. 1, it has an elliptical outline as shown in FIG. 2. The elliptical outline incorporates the beak 7, the channel 8 and the opening 10. As seen in FIG. 1, the beak 7 projects longitudinals at the distal end of the banana curved cauling section 5 at one side of said distal end. The beak 7 has a rounded curved shape which merges with channel 8. The guide hole 9 extends in the direction of the beak 7 and its outlet opening 10 is adjacent to the beak and separated therefrom by channel 8.

In operation, the tool is advanced in the direction of the arrow in FIG. 1 along the channel 3, and the beak 7 applies pressure on the sealant which has been deposited into the channel in the direction of the arrow normal to the sealant. The channel 8 is elevated above the sealant and the heel of the distal end of the caulking section bears against the bottom of the channel.

What is claimed is:

1. A caulking tool for the insertion of sealant into a glazing channel of a window frame of a commercial vehicle, said tool comprising a handle and a caulking section extending from said handle and being curved in the form of a banana, said caulking section having a distal end including a beak proximally adjoining a channel, said caulking section being provided with a guide hole for sealant, said guide hole having an inlet for sealant which opens laterally of said caulking section adjacent to the handle and an outlet at said distal end adjacent to the channel, the distal portion of the tool having a substantially elliptical outline when viewed endwise in the direction of the guide hole, said beak projecting longitudinally at said distal end of the banana curved caulking section at one side of said distal end to form a portion of said elliptical outline, said beak having a rounded curved shape which merges with said channel, said guide hole extending generally in the direction of projection of the beak and said outlet of the guide hole being adjacent to said beak at said distal end and separated therefrom by said channel.

2. The caulking tool as claimed in claim 1 wherein said handle and said caulking section are integral.

3. The caulking tool as claimed in claim 2 wherein said handle and caulking section are made of a molded resin.

4. The caulking tool as claimed in claim 3 wherein said molded resin is an acetal resin.

5. The caulking tool as claimed in claim 3 wherein said molded resin is DELRIN 150 SA/100 heat tempered at 160° C.±3°.

6. The caulking tool as claimed in claim 3 wherein said handle has a surface which is superficially roughened to enable the firm gripping thereof.

* * * * *